(12) United States Patent
Bertetti et al.

(10) Patent No.: US 6,379,050 B1
(45) Date of Patent: Apr. 30, 2002

(54) WHEEL HUB BEARING UNIT

(75) Inventors: Paolo Bertetti, Turin; Mauro Picca, Perosa Argentina (TO); Fabrizio Iarrera, Turin, all of (IT)

(73) Assignee: SKF Industries S.P.A., Turin (IT)

( * ) Notice: Subject to any disclaimer, the term of this patent is extended or adjusted under 35 U.S.C. 154(b) by 0 days.

(21) Appl. No.: 09/371,190

(22) Filed: Aug. 10, 1999

Related U.S. Application Data

(62) Division of application No. 08/749,004, filed on Nov. 14, 1996, now Pat. No. 5,988,324.

(30) Foreign Application Priority Data

Jan. 11, 1996 (IT) .......................................... TO96A0011

(51) Int. Cl.⁷ .............................................. F16C 19/08
(52) U.S. Cl. ...................... 384/537; 384/544; 188/18 A
(58) Field of Search .................................. 384/537, 544, 384/585, 589, 584, 448; 188/18 A

(56) References Cited

U.S. PATENT DOCUMENTS

| | | | | |
|---|---|---|---|---|
| 3,884,331 A | * | 5/1975 | Asberg | 188/18 A |
| 5,490,732 A | * | 2/1996 | Hofmann et al. | 384/537 |
| 5,590,967 A | * | 1/1997 | Kapaan | 384/448 |
| 5,988,324 A | * | 11/1999 | Bertetti et al. | 384/537 |

* cited by examiner

Primary Examiner—Lenard A. Footland
(74) Attorney, Agent, or Firm—Merchant & Gould P.C.

(57) ABSTRACT

In a vehicle wheel hub bearing unit the bearing forms a rotating radial flange (11) adapted for securing to a radial flange (12) of a disc or drum brake member and rotate fixedly therewith. The brake flange (12) is located in the same radial plane of the bearing flange (11) and secured directly to the peripheral portion thereof. Radial bulk of the bearing assembly is reduced and deformation of the bearing races and braking surface is avoided.

1 Claim, 5 Drawing Sheets

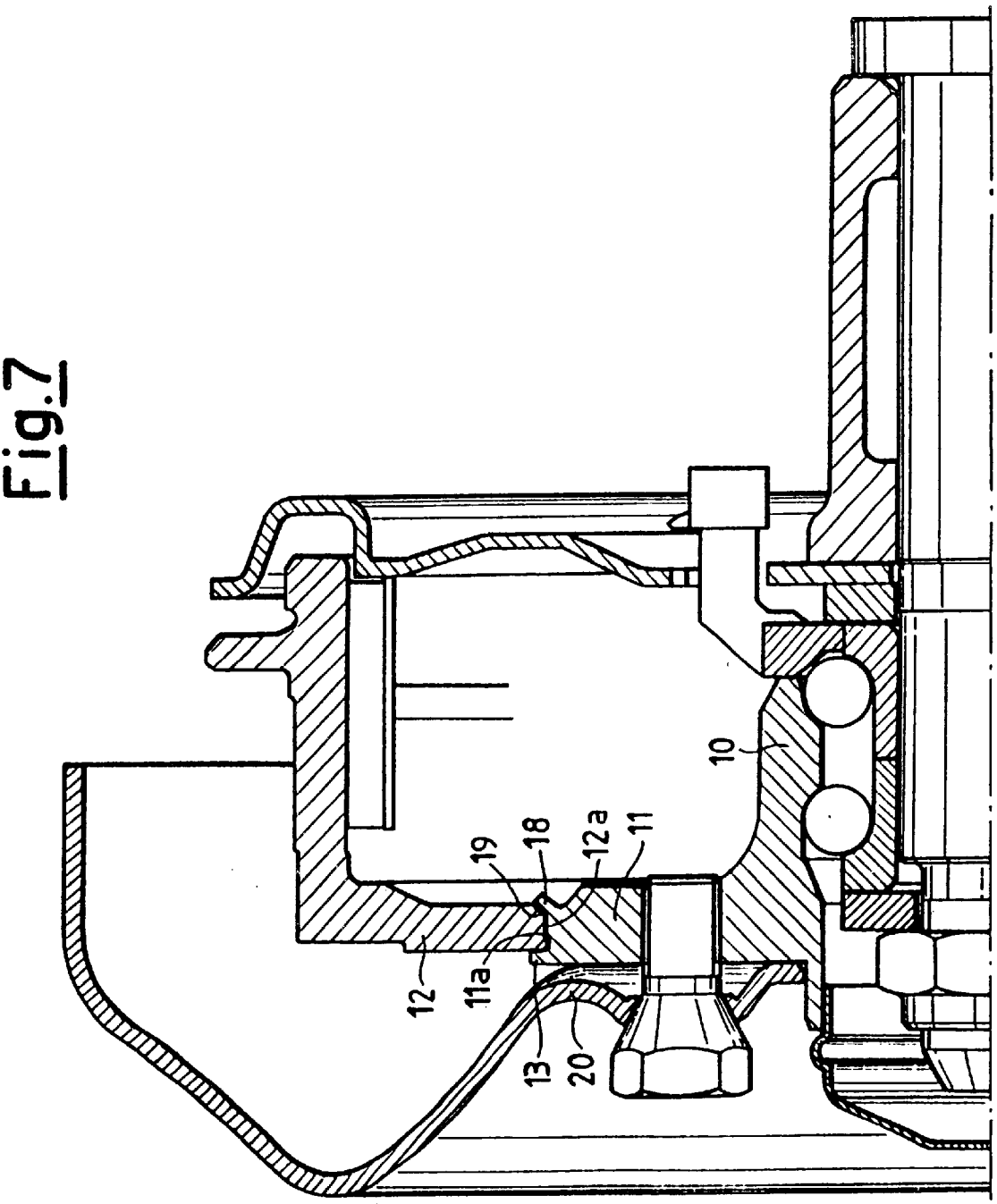

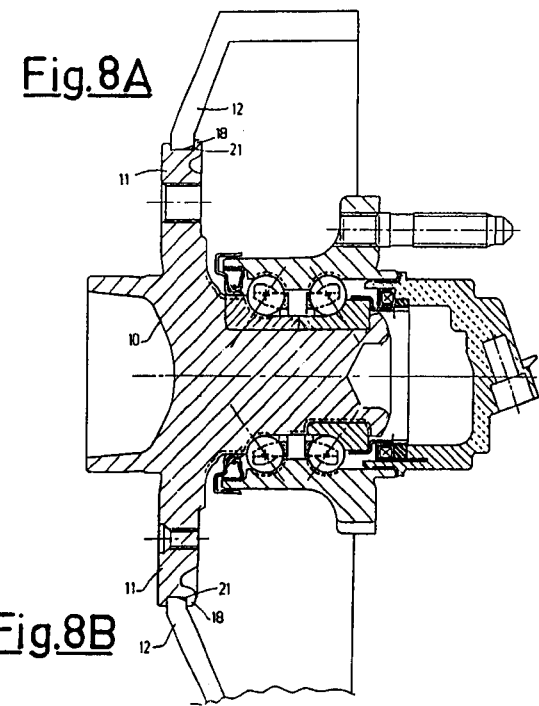
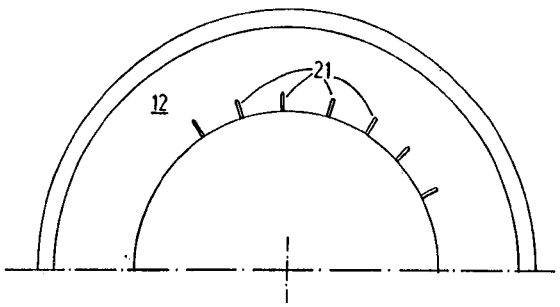

WHEEL HUB BEARING UNIT

This application is a Division of Ser. No. 08/249,004 filed Nov. 14,1996 now U.S. Pat. No. 5,988,324.

DESCRIPTION

The present invention relates to a vehicle wheel hub bearing unit.

It is known that the part of the bearing of a vehicle wheel hub must be fixedly connected to the disc or drum brake member so as to transmit the braking torque form the brake to the wheel.

FIGS. 1 and 2 are partial axial cross-sections illustrating two conventional solutions with disc and drum brakes, respectively, applied to flanged bearings of the so-called II generation. Similarly, disc or drum brakes can be applied to the so-called II generation bearings. In both the illustrated solutions the wheel rim, the brake member flange and the bearing flange are axially overlapping so as to interpose the brake member flange between the rim and the bearing flange. These three bodies are jointed by screwing the wheel bolts with the prescribed tightening torque.

Tightening of the bolts causes axial compression of the central portion of the wheel rim on the brake flange and of the latter on the bearing flange. This coupling arrangement has a drawback in that owing to geometrical defects such as planarity errors of the central part of the wheel rim, tightening of the bolts causes deformation of the braking surface and the bearing races.

A further drawback occurring is due to radial centering clearance of the brake/bearing coupling. Planarity errors of the relevant flanges concur in deforming the braking surface on tightening said bolts.

It is an object of the present invention to provide a vehicle wheel hub bearing unit which allows to obviate the above discussed inconveniences. Particularly, it is desired to provide a coupling system between the bearing and the brake member wherein tightening of the wheel bolts does not adversely affect the bearing races and the braking surface.

It is another object of the present invention to provide a coupling arrangement between the brake member and the bearing having a reduced axial bulk.

A further object of the present invention is to provide a coupling arrangement which, although reducing axial bulk as compared to prior art, allows to mount a bearing flange which is thicker and, consequently, less likely to undergo deformation caused by the coupling to a non-planar rim.

In accordance with one aspect of the invention as claimed, these objects are accomplished by the provision of a vehicle wheel hub bearing unit of the type in which the bearing forms a rotating radial flange adapted for securing to a radial flange of a brake member and rotate fixedly therewith, characterised in that the brake flange is located in the same radial plane of the bearing flange and secured directly to the peripheral portion thereof.

In order that the present invention may be well understood there will now be described a few preferred embodiments thereof, given by way of example, reference being made to the accompanying drawings, in which:

FIGS. 3 to 7 are partial axial cross-sectional views schematically illustrating bearing/brake assemblies in accordance with the present invention; and FIGS. 8A, 8B and 9 are axial cross sections and front views, respectively, of further embodiments of this invention.

Figure 1:
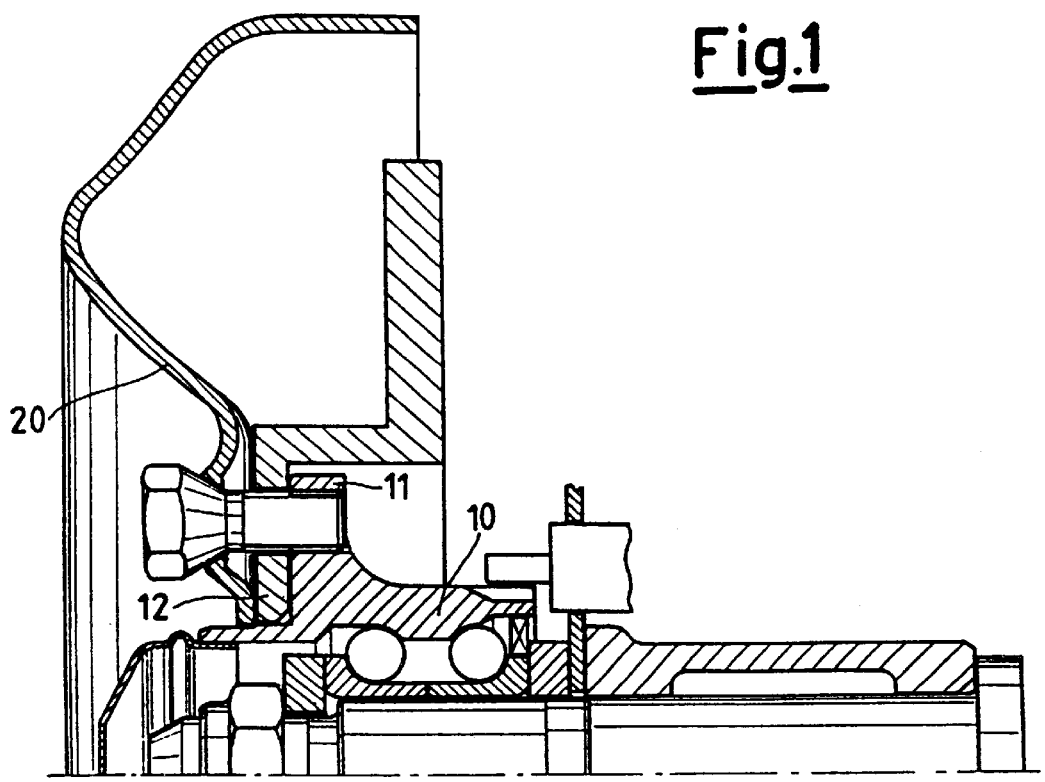
FIGS. 1 and 2 are partial axial cross-sectional views schematically illustrating prior art bearing/brake units.
Figure 2:
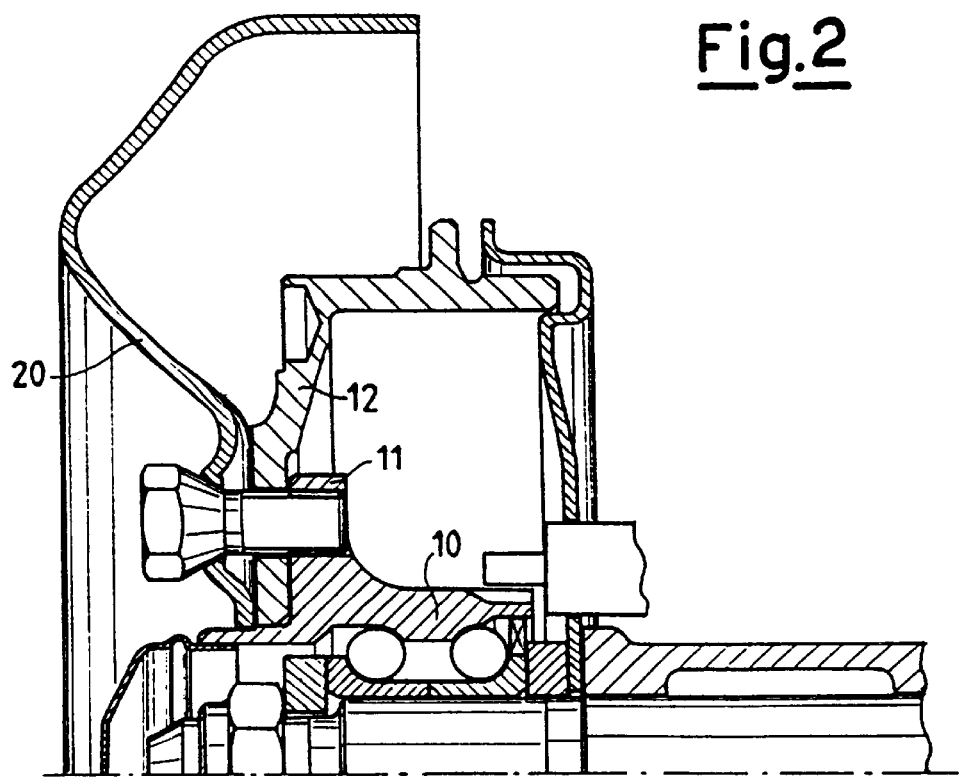
Figure 3:
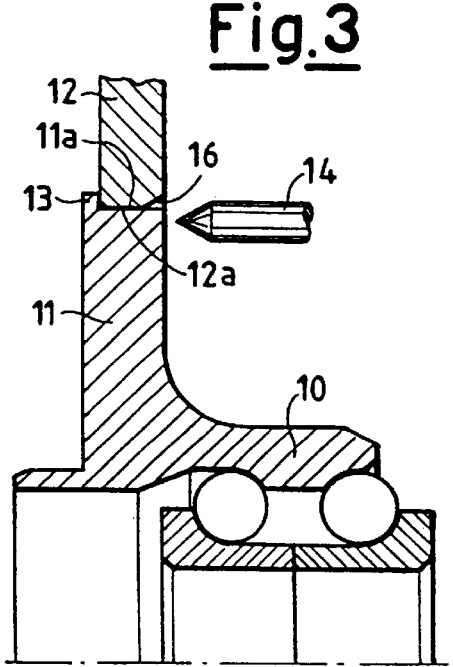
Figure 4:
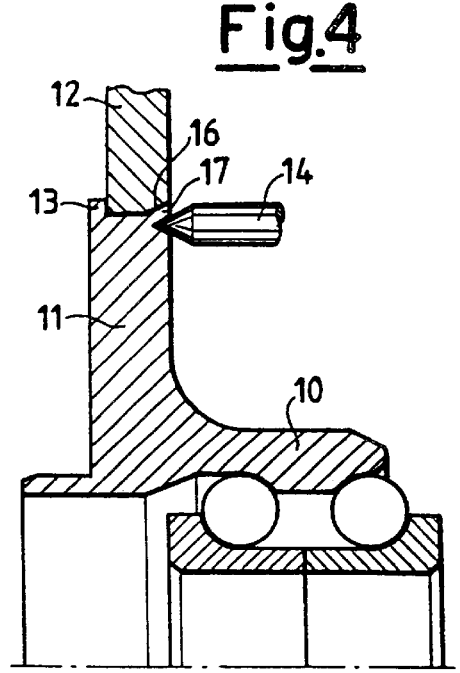

With reference initially to FIGS. 3 and 4, the outer race 10 of a rolling contact bearing forms a radial bearing flange 11. The vehicle brake member may indifferently be of the disc or drum type, and forms a brake flange 12.

According to the present invention, the brake flange extends in the same radial plane of the bearing flange 11 and is directly fixed to the peripheral part thereof. In the example of FIGS. 3 and 4, locking is accomplished by radial interference and is completed by randomly deforming the end portion of the bearing flange. To this end, a segmental punch 14 may be used.

Transmission of the braking torque is provided by radial interference of the two cylindrical surfaces 11a, 12a of the bearing flange 11 and the brake flange 12, respectively. These surfaces may either be smooth or rough (for example knurled). Punching prevents axial displacement between the brake and the bearing flanges. Punching operation may indifferently be carried out on the brake or the bearing flange. Preferably, at the punching location the non-punched member (bearing or brake) provides a seat well adapted for receiving the parts of the other member being punched. Suitable seats are, for example, chamfers or recesses.

Figure 3A:
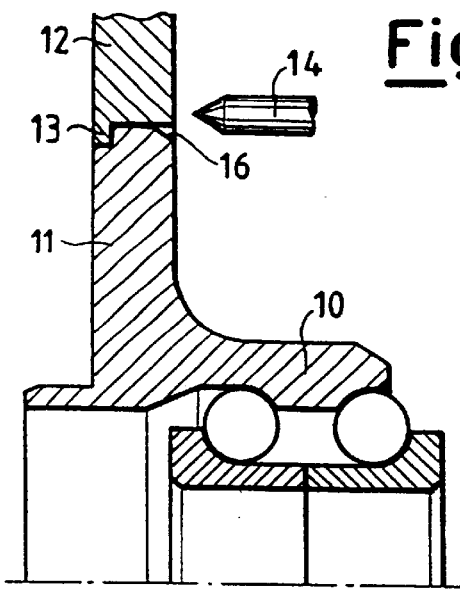
Figure 3B:
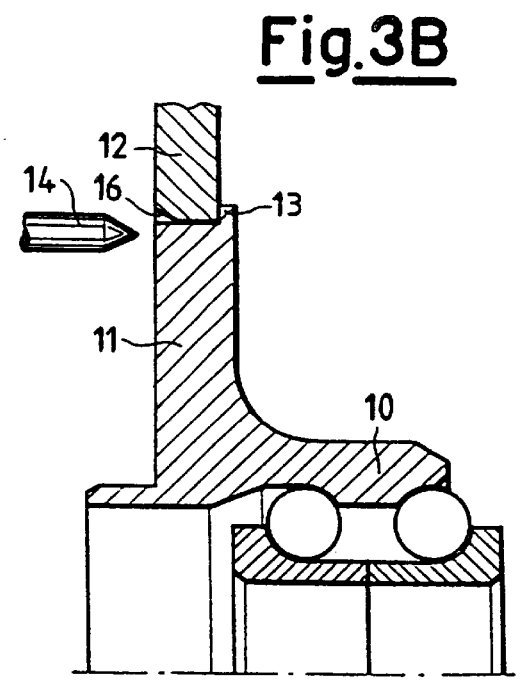
Figure 3C:
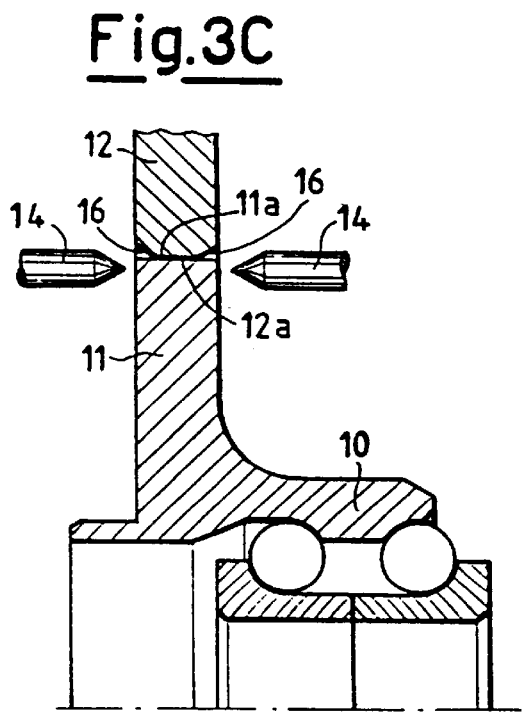

In the embodiment illustrated in FIGS. 3 and 4, punching is carried out on the bearing flange 11 at its (right) edge 15 facing the inside of the vehicle (not shown). A corresponding seat 16 facing said bearing flange edge 15 is obtained in the brake member flange 12. In the illustrated embodiment, the bearing flange 11 forms a side edge 13 radially protruding from the side of the flange opposite to the punching side so as to provide an abutment which facilitates punching. The punching of bearing flange edge 15 (FIG. 4) yields a plurality of deformations 17 which copy the shape of the seat 16 and clamp the brake member 12 onto the opposite edge. 13. According to a variant embodiment shown in FIG. 3C, the outer edge 13 is absent and punching is therefore carried out on both sides of bearing flange 11. FIGS. 3A and 3B show two further variant embodiments wherein punching is performed on the brake member or on the side facing the outside of the vehicle, respectively.

The above arrangement described in several embodiments is such that torque transmission between the two members is not affected by tightening of the wheel bolts.

In a further, not shown embodiment, as an alternative to those of FIGS. 3 and 4, transmission of the braking torque instead of being attained by radial interference coupling is accomplished by means of a splined coupling of the contacting surfaces of the brake member and the peripheral part of the bearing flange.

In a further variant embodiment (not shown), transmission of the braking torque is attained by welding the contacting surfaces of the brake member and the bearing flange. Welding may extend throughout the entire contacting circumference or be limited to random points or segments. Suitable welding operations comprise laser welding, electronic beam welding, or capacitor discharge welding.

Figure 5:
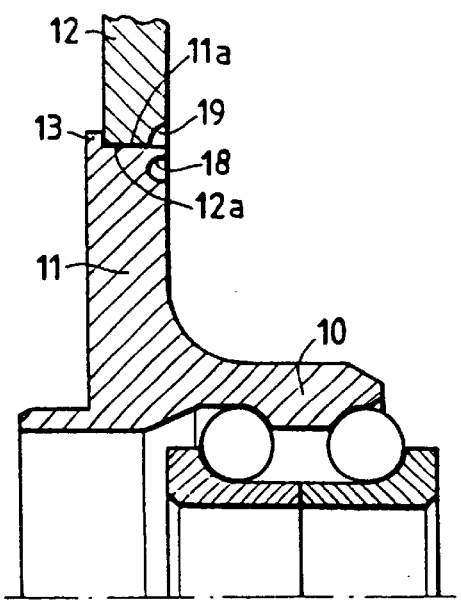
Figure 6:
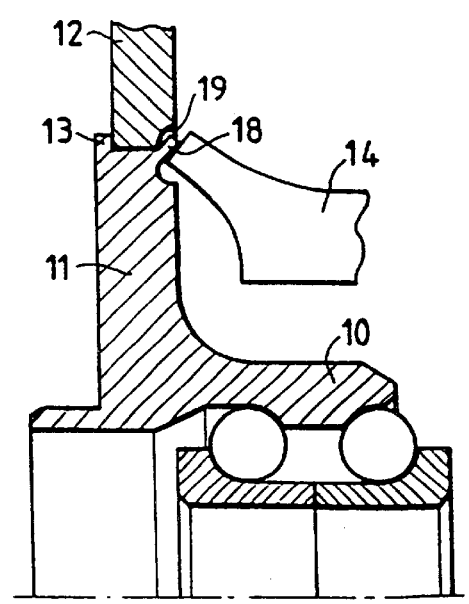

With reference to FIGS. 5 and 6, a further variant embodiment of this invention ensures torque transmission and mutual axial locking action by rolling a substantially axial rim 18 (FIG. 5) provided at the edge of one of the sides of the bearing flange. Rim 18 is rolled and folded (FIG. 6) so as to engage recesses or projections 19 obtained in the side surface of the brake flange.

Upon assembling the brake to the bearing flange, the disc or drum braking surface is advantageously subjected to a finishing operation in order to eliminate defects due to coupling tolerances.

As an alternative, finishing of the braking surface may be carried out after the brake is mounted to the bearing assembly, thereby eliminating also runout defects of the bearing as well as defects owing to coupling tolerances.

Referring to FIG. 7, the wheel rim 20 is directly coupled to the bearing flange without interfering with the brake flange. As both the bearing flange and the brake flange lie in the same radial plane instead of being flanked, the bearing flange may be thicker and more rigid as compared to prior art solutions, overall bulk being equal. Hence, deformation of the bearing races due to coupling to a non-perfectly planar rim are minimised.

Referring to FIGS. 8A and 8B, to improve locking of the drum to the bearing flange, a plurality of preferably equally spaced recesses or dents 21 of limited depth are obtained at the inner edge of the drum. The recesses 21 enhance the effect of rolling and prevent relative rotation between the drum and the bearing flange. During rolling, the recesses are to some extent penetrated by the rim 18 being rolled.

The present invention is particularly well suited for application with bearings of the II and III generation. In FIG. 8A (upper part of the drawing) the solution is applied to a bearing assembly in which the inner rolling race is divided in two adjacent half-races forcefully fitted on the wheel hub. In FIG. 8B (lower part of the drawing) the solution is applied to a bearing assembly wherein one of the races is formed by a separate half-race, whilst the other is obtained in the same wheel hub.

As compared to known solutions, the brake is coupled to the bearing flange on a smaller surface, which as a result reduces the amount of heat from the brake which is transmitted to the bearing.

The brake flange is considerably smaller with respect to prior art, whereby a saving in time and costs is achieved as well as weight reduction.

The disclosures in Italian patent application No. TO96A0000011 from which this application claims priority, and in the abstract accompanying this application are incorporated herein by reference.

What is claimed is:

1. A method of assembling a vehicle wheel hub bearing unit, the method comprising the steps of:

providing a bearing having a rotatable radial bearing flange, said bearing flange defining a peripheral outer edge;

providing a brake member having a brake flange, said brake flange defining an inner edge;

locating the bearing flange and the brake flange in substantially the same radial plane;

securing the outer edge of the bearing flange to the inner edge of the brake flange by rolling and folding substantially axial, a peripheral rim provided on one of said flanges so as to engage locking seats provided on the other of said flanges so as to fixedly secure the brake member for rotation with the rotatable bearing flange; and performing a finishing operation on a braking surface of the brake member so as to eliminate runout defects (or planarity errors).

\* \* \* \* \*